Jan. 19, 1971  J. A. LEASURE, JR., ET AL  3,555,816
ROCKET MOTOR
Filed April 20, 1961  2 Sheets-Sheet 1

JOHN A. LEASURE, JR.
JOHN H. MAIN
RICHARD WINER
INVENTORS

BY Ernest G. Peterson
AGENT

Jan. 19, 1971   J. A. LEASURE, JR., ET AL   3,555,816
ROCKET MOTOR
Filed April 20, 1961   2 Sheets-Sheet 2
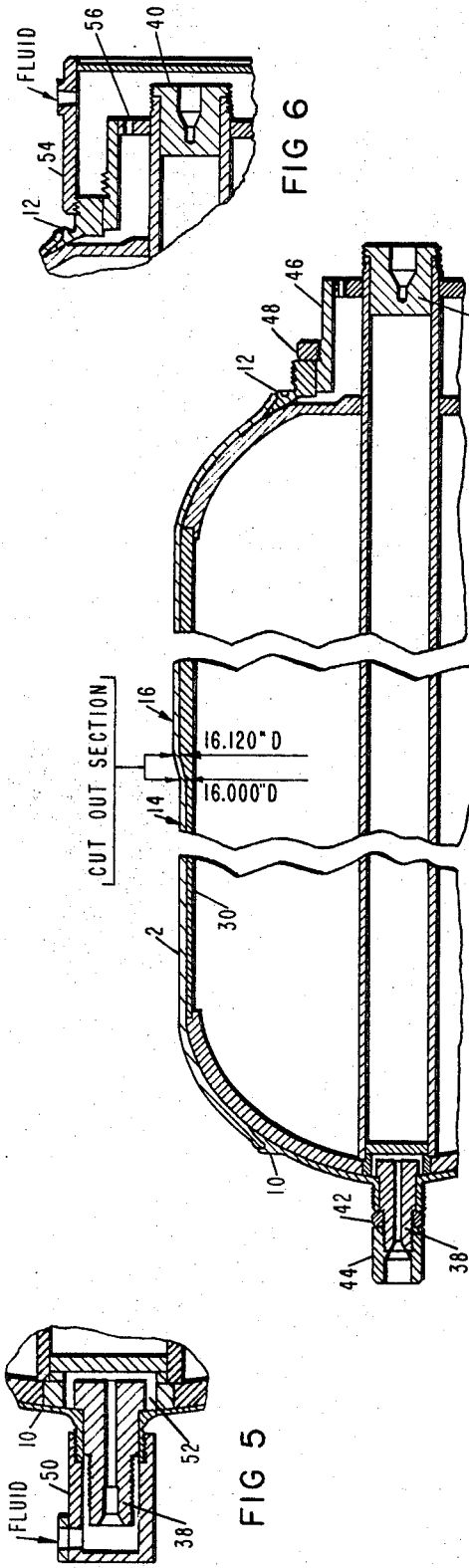
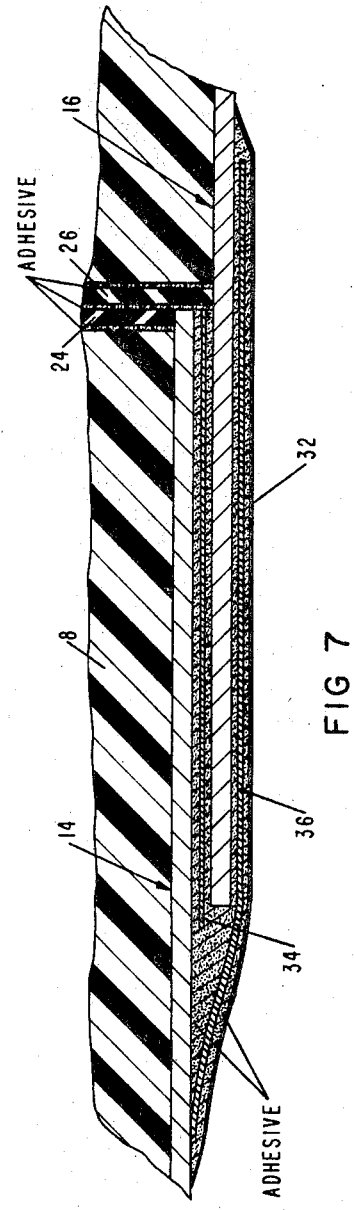
JOHN A. LEASURE, JR.
JOHN H. MAIN
RICHARD WINER
INVENTORS
BY Ernest G. Peterson
AGENT

United States Patent Office 3,555,816
Patented Jan. 19, 1971

3,555,816
ROCKET MOTOR
John A. Leasure, Jr., and John H. Main, Salt Lake City, Utah, and Richard Winer, Cumberland, Md., assignors to Hercules Incorporated, Wilmington, Del., a corporation of Delaware
Filed Apr. 20, 1961, Ser. No. 104,469
Int. Cl. F42b 1/02
U.S. Cl. 60—39.47                    5 Claims This invention relates to gas-generating devices and more particularly to rocket motors and the like and their method of manufacture.

The present state of preferred art for the manufacture of solid propellant rockets consists in casting a propellant charge into a rocket chamber having certain characteristics and design to meet particular ballistic requirements. The desired thrust-time relationship is achieved through the geometrical configuration of the propellant charge. The rocket motor is designed for a specific end application and the performance, in most cases, is such that it cannot be appreciably altered for use in other applications. Furthermore, many propellant charges which have been designed have significant amounts of slivers which represent unusable propellant. In most instances where sliverless designs have been employed, the charge configurations have been such that considerable amount of thermal insulation has been required to protect the rocket motor chamber from the high gas temperatures at least in certain areas. Still further, in the manufacture of solid propellant charges having internal configurations, it is necessary to employ a mold to achieve the particular grain geometry desired. A part of this mold involves a core which must pass through the opening in the rocket chamber. It is often necessary to have a core of significant diameter to achieve the charge configuration. In contrast to this, the rocket designer always seeks to limit the diameter of the access to the motor in order to keep closure weights at a minimum. The large cores required and the desire for a small opening in the chamber are not compatible. Although this problem has been solved by the use of multi-segment cores of complex geometry, such systems are extremely expensive and require a considerable amount of assembly and disassembly time. Moreover, an additional problem which has been experienced in the past in the casting of propellant charges through restricted openings has been the difficulty encountered in achieving proper casting powder loading density to produce satisfactory propellant.

From the foregoing, it is evident that there is considerable need for advances in the art for the manufacture of rocket motors and particularly where high-performance rocket motors are desired. Furthermore, it is evident that there is considerable need to attain objectives that would render such high-performance rocket motors more versatile for application without resorting to techniques requiring a major redesign. It will be apparent from the detailed description given hereinafter and from the appended claims that these needs are accomplished in accordance with this invention.

Generally described, in accordance with the present invention, multiple layers of propellant having different ballistic properties are arranged radially within the combustion chamber of a rocket motor, the highest burning rate system being in the minor diameter of the charge and the burning rates decreasing in each succeeding layer with the lowest being in contact with the chamber wall. By such a technique it has been possible to achieve rocket performance which is essentially of a neutral characteristic, i.e., the thrust being substantially of a constant level during burning. The thrust-time curve obtained is of a saw-tooth characteristic. That is, the thrust increases during the burning of a given propellant layer until its outer extremity is reached. At that point, a propellant having a lower burning rate is uncovered and ignited and the thrust level decreases to a new value. The configuration then becomes progressive during the burning of this new propellant layer and the sequence of ignition is repeated. The propellant layers extend longitudinally and intersect the forward and aft domes of the rocket motor. This design yields essentially a simultaneous complete burnout of the last layer of the propellant charge over the interior cylindrical surface of the motor wall, thereby achieving a major reduction in inert weight by the elimination of thermal insulation normally required to protect the combustion chamber in this area.

Moreover, the present invention includes the manufacture of the motor components in multiple segments and the bonding thereof. The segments are joined at areas along the cylindrical portion of the motor with a lightweight adhesive bond. This technique has made it possible to achieve motor manufacture with free access to the interior of the chamber during propellant processing. This allows for much better loading of casting powder into the mold and greatly simplifies the processing equipment required. Subsequent to the segment manufacture, the unit is prepared for bonding. The exact number of joints to be employed in a given application depends on the particular end use.

A preferred embodiment of the invention has been chosen for purposes of illustration and description and is shown in the accompanying drawings wherein reference symbols refer to like parts wherever they occur and wherein:

FIG. 4 is a fragmentary, longitudinal, sectional view depicting the formation of the casing for the rocket motor illustrated in FIGS. 1 and 2;

FIG. 5 is a longitudinal, sectional view depicting fluid pressure means for removing the forward section of the casing from the mandrel illustrated in FIG. 4;

FIG. 6 is a longitudinal, sectional view depicting fluid pressure means for removing the aft section of the casing from the mandrel illustrated in FIG. 4; and FIG. 7 is an enlarged, longitudinal, sectional view of the bond joint utilized in bonding the forward and aft sections of the rocket motor casing and propellant together.

Figure 1:
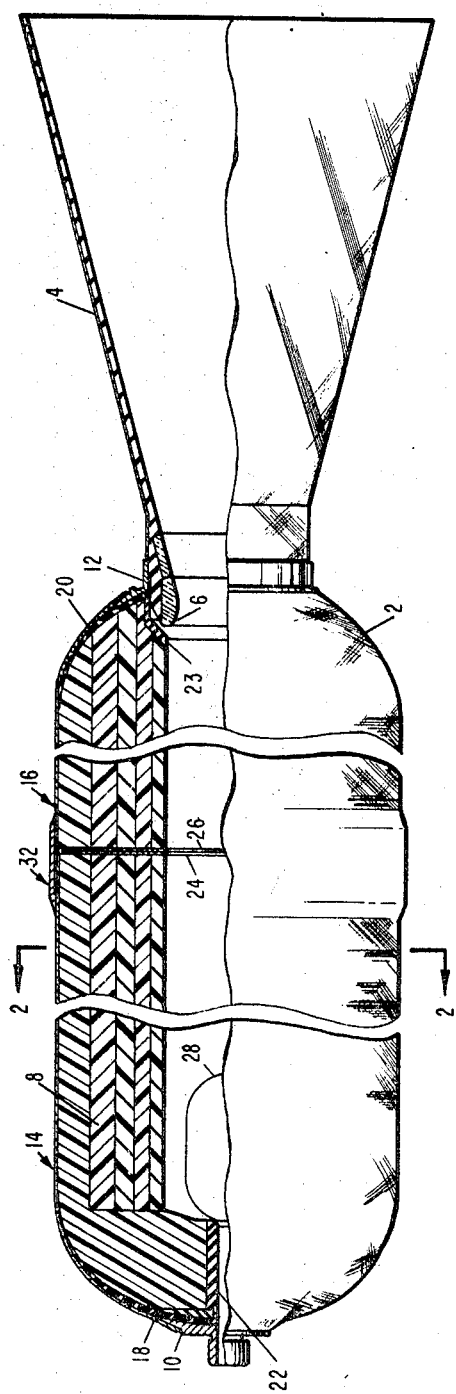
FIG. 1 is a longitudinal, part sectional and part elevational view of a gas-generating device in the form of a rocket motor illustrating the application of the invention.

Referring now to the drawings, the rocket motor in accordance with the present invention comprises a lightweight oriented glass fiber reinforced casing 2, a molded asbestos-filled phenolic nozzle 4 with a graphite throat insert 6, and a high specific impulse propellant charge 8. The casing 2 was fabricated of helically wound fiberglass roving embedded in a matrix of epoxy resin and had an aluminum adapter at both the forward end and the aft end 10 and 12, respectively. The casing unit was cut circumferentially in the cylindrical section, making a forward section and an aft section 14 and 16, respectively. The nozzle 4 was a standard convergent-divergent type nozzle made of an asbestos-filled phenolic material with the graphite insert 6 at the throat integral therewith. The exterior surface of the nozzle was wrapped with fiberglass roving embedded in a matrix of epoxy resin to achieve the necessary structural strength.

Figure 3:
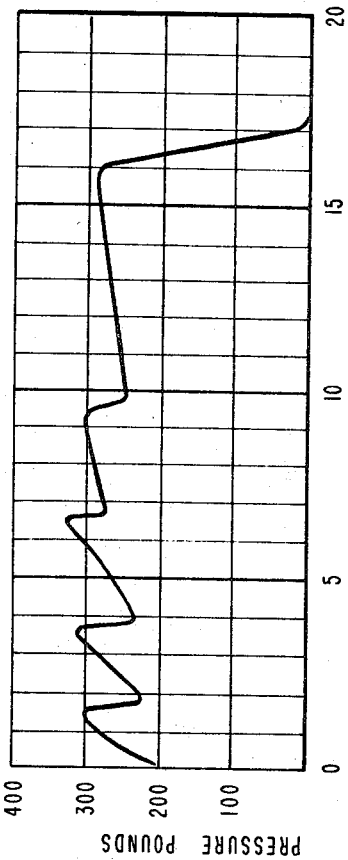
FIG. 3 is a graph depicting the pressure-time relationship of the multiple layer propellant illustrated and described in conjunction with FIGS. 1 and 2.
Figure 2:
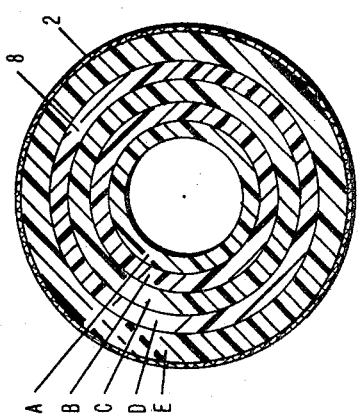
FIG. 2 is a full sectional view taken along the section 2—2 of FIG. 1.

The propellant charge 8 consisted of five concentric layers of high-impulse modified double-base propellant. The propellant positions are shown in FIG. 2 and their compositions given in Table I. These layers were positioned to yield the pressure-time relationship shown in FIG. 3. From this graph it is noted that the pressure peaks do not deviate appreciably from the mean value.

The fabrication of the rocket motor in accordance with this invention consists of winding and curing the casing 2 with the adapters 10 and 12 in place, inspection, installation of the forward and aft insulators 18 and 20, respectively, powder embedding, bonding the forward phenolic core support and inhibitor 22, bonding the aft inhibitor 23, and air testing, powder loading, casting, and curing. The propellant charge 8 is then machined to final dimensions and radiographically inspected. Radial plane inhibitors or discs 24 and 26 are bonded in place and the forward and the aft sections 14 and 16, respectively, are bonded together. A suitable igniter represented by 28 and the nozzle 4 are then installed. This fabrication technique is more fully described as follows.

The winding of the casing 2 consisted of the orderly wrapping of the resin impregnated glass filaments on to a rotating mandrel 30 with the adapters 10 and 12 affixed thereto with the wrapping proceeding over the outer flanges of the adapters to securely bond them to the casing. These filaments were wrapped in both the circumferential and helical directions to balance the stresses and give the lightest possible casing or chamber thereby formed. The forward and aft sections 14 and 16, respectively, of the casing 2 were wrapped on the single mandrel 30 which had an increase in the outside diameter of 0.120 inch at the middle section to give an aft section of slightly larger inside diameter (see FIG. 4). After the casing 2 had been wrapped and cured, it was cut circumferentially at each transition point between the 16,000-inch diameter and the 16.120-inch diameter to give two separate parts; the forward part or section 14 being small enough, due to the difference in diameters, to be slipped inside the aft part or section 16. The two parts were bonded together in a later operation to give one complete chamber (this step is discussed in detail later). These two sections were visually and dimensionally inspected. Upon completion of the inspection, the units were started through processing. Insulators 18 and 20, respectively, were bonded to the fore and to the aft domes of sections 14 and 16. The first step in bonding of the insulators was to remove any mold release agent. The smooth surface on the inside of the sections forming the chamber was then roughened by sanding and buffing. The insulators were then coated with primer and allowed to cure for 16 hours at 100° F. Upon completion of the cure step, epoxy-amine-flexibilized adhesive was then applied to both the mating chamber surfaces and the insulator surfaces and the parts pressed together and cured for 8–16 hours at 70° to 85° F. A barrier coat of epoxy-polyamid resin was then brushed on the inner surface of each of the insulators. A second coat of epoxy-polyamid resin was then applied to the interior of the insulator and to the interior of the chamber wall of each section, and casting powder was embedded in this material. The embedment layer was from about one to about two powder granules in depth.

The next step in fabrication of the motor was to bond the forward core support 22 with epoxy-polyamid resin to the insulator 18 on the forward end while the unit was in the casting fixtures (there is no support on the aft section of the chamber). Casting powder was then loaded. The powder loading was accomplished in two steps. The first was to load the lowest burning rate powder E in the forward dome only. Then aluminum separators which were subsequently removed with the exception of the inner core members were placed in the forward and aft end of each section to allow the different type casting powders A to E, inclusive, Table I, to be loaded into each specified section to form concentric layers. The casting powders had a granule size in the order of about 0.06 inch, which size afforded good packing efficiency. Upon completion of loading, a vacuum was applied to the motor sections to remove moisture from the powder granules. This vacuum was held for 16 hours, after which casting solvent of nitroglycerin, triacetin, and 2-nitrodiphenylamine was introduced in conventional manner simultaneously to all five casting powders with a vacuum applied to the casting powder during the operation. After casting, the two sections of the unit were allowed to cure for 4 days at 140° F.

TABLE I.—PROPELLANT CHEMICAL COMPOSITIONS

| | NC, percent | N, percent | NG, percent | AP, percent | Al, percent | TA, percent | NDPA, percent | HMX, percent | Resorcinol, percent |
|---|---|---|---|---|---|---|---|---|---|
| Layer: | | | | | | | | | |
| A | 22.1 | 12.6 | 28.6 | 22.0 | 20.2 | 5.1 | 1.0 | | 1.0 |
| B | 19.8 | 12.6 | 33.8 | 13.2 | 18.2 | 6.4 | 1.0 | 6.6 | 1.0 |
| C | 20.0 | 12.6 | 33.1 | 10.1 | 18.4 | 6.3 | 1.0 | 10.0 | 1.0 |
| D | 21.5 | 12.6 | 30.0 | 8.9 | 19.7 | 5.4 | 1.0 | 12.5 | 1.0 |
| E | 20.4 | 12.6 | 32.4 | 6.8 | 18.7 | 6.1 | 1.0 | 13.6 | 100 |

NOTE.—Nomenclature: NC=Nitrocellulose; N=Nitrogen; NG=Nitroglycerin; AP=Ammonium Perchlorate; Al=Aluminum; TA=Triacetin; NDPA=2-nitrodiphenylamine; HMX=Cyclotetramethylene tetranitramine.

More particularly, with reference to FIG. 7, when the cure step was completed and the inner core members removed, the unit was ready for the final steps of fabrication which were machining, radiographic inspection, and bonding of the two sections together. The individual sections were machined to prepare them for bonding. The machining of the forward section consisted of contouring the forward end of the charge, machining the face of the charge 8 in this section, and removing approximately four inches of chamber wall so that the aft edge of the casing 14 projected 1/16 inch beyond the face of the charge. From this aft edge forward for 2 inches formed the male part for the bond joint in the bond area 32. The machining of the aft section consisted of machining the face of the charge 8 in this section, and removing all but 2 inches of the casing 16 forward of the charge face. This projection now formed the female part for the lap joint in the bond area 32. Upon completion of the machining, the two sections of the unit were examined by radiographic analysis to detect cracks, separations, and porosity. With examination showing the two sections of the unit to be acceptable, rubber discs 24 and 26 were applied over each machined face. These discs were coated with primer and bonded to the exposed charge faces with a polyurethane adhesive and were allowed to cure for 8–16 hours. Upon completion of the curing, the fore and aft sections of the unit were ready to be bonded together with the casing thereof ready for telescopic engagement and the charges ready for abutment to each other.

The bonding of the units consisted of the following steps in the order named: (1) degrease telescopic bonding surfaces of casings 14 and 16 with acetone; (2) remove glaze on surfaces with steel wool or fine emory paper; (3) prime surfaces with epoxy-polyamid resin and allow to dry; (4) remove glaze from prime coat on surfaces with steel wool and fine emory paper; (5) apply epoxy-polyamid resin to both sides of a piece of glass tape 34; allow the resin to work into the tape until it becomes translucent; (6) insert the adhesive-laden tape into casing 16; (7) slide casing 14 into position within casing 16 to mate the rubber discs 24 and 26; this procedure additionally removes large entrapped air pockets from the glass tape; (8) after the two sections are together, apply epoxy-polyamid resin to the outside of both sections in the bond area; (9) repeat step (5) and wrap the similarly prepared glass tape 36 tightly around the bond joint area; (10) again apply epoxy-polyamid resin over the tape 36 and bond surfaces; (11) wrap teflon tape (adhesive side out) around the bond joint area to prevent the adhesive from flowing out; (12) cover the teflon tape with masking tape; (13) cure the unit thus prepared at 100° F. for 24 hours; and (14) after curing, inject polyurethane resin under pressure between the rubber discs 24 and 26 from the interior thereof to insure a tight seal and bond therebetween. The above described procedure gives a bond joint as shown in FIG. 7 after removal of the teflon and masking tapes. The aft phenolic charge inhibitor 23 was then bonded to the aft portion of the propellant charge adjacent to the throat of the nozzle with epoxy-polyamid resin. The igniter 28 and the nozzle 4, which included the graphite throat insert 6, were next assembled into the unit to give the completed rocket motor as shown in FIG. 1.

The rocket motor heretofore described had a diameter of approximately 16 inches and had a total length exclusive of the nozzle of approximately 64.8 inches. The propellant weight achieved in the motor was 576.3 pounds using the following approximate layer thicknesses given in inches: A—0.687; B—0.829; C—0.962; D—0.982; E—1.540; and with the thickness adjacent the forward end approximately 4.160 inches. The motor mass ratio, i.e., propellant weight over gross motor weight, was 0.942. The delivered specific impulse of the propellants utilized was 250 lb.-sec./lb. at 1000 p.s.i. and sea level.

From the foregoing, it is evident that this invention may be carried out by the use of various modifications and changes without departing from its spirit and scope. For example, a particularly efficacious system for stripping the casing sections 14 and 16 from the mandrel 30 after cutting the casing 2 into the two parts was found to reside in hydraulic stripping which is more readily seen with reference to FIGS. 4, 5 and 6. In this system, mandrel spindles 38 and 40, respectively, were provided for centering of the mandrel 30 for rotative movement during the winding of the filament material thereon, more particularly, in accordance with the method, resins and filament materials disclosed in U.S. Pat. 2,843,153 to R. E. Young. The forward spindle 38 was ported and formed an integral part of the mandrel 30. The forward adapter 10 was placed over the spindle 38 and was held securely in place on the mandrel 30 by a threaded lock nut 42. A threaded centering cap 44 to insure firm centering was then screwed against the lock nut 42. This completed, the forward section was ready for winding. In a somewhat similar manner, the aft spindle 40, which also was an integral part of the mandrel 30, had a concentric casing 46 which was ported. The aft adapter 12 was placed over the concentric casing 46 and was held securely in place on the mandrel 30 by a threaded lock nut 48. This completed, the aft section was ready for winding. The casing material was then wound over the mandrel including the flanged portion of the forward and aft adapters, and after curing, the casing was circumferentially cut to make a fore and aft section as heretofore described. The two parts of the casing were now ready for stripping from the mandrel.

Referring now more particularly to FIGS. 5 and 6, for stripping the forward section of the casing, the members 42 and 44 (FIG. 4) were removed. A front stripping head 50 was screwed onto the forward adapter 10 and pressure fluid (<100 p.s.i.) medium was passed into the stripping head. The fluid pressure thus delivered passed through a plurality of ports represented by 52 and due to further confinement was then exerted against the interior side of the adapter 10, causing it and its casing to move forward and release from the mandrel, after which the whole section was easily removed. Similarly, for stripping the aft section of the casing, the member 48 (FIG. 4) was removed. A rear stripping head 54 was screwed onto the aft adapter 12 and pressure fluid (<100 p.s.i.) medium was passed into the stripping head. The fluid pressure thus delivered passed through a plurality of ports represented by 56 and due to further confinement was then exerted against the interior side of the adapter 12, causing it and its casing to move rearward and release from the mandrel, after which the whole section was easily removed. It will be appreciated that this system of hydraulic stripping is quite superior to mechanical stripping in that the fluid pressure medium tends to be forced between the mandrel and the adapters, thus progressively increasing the area of uniformly applied thrust. This prevents any localized over-stressing or damage to the units as sometimes encountered with mechanical stripping.

It is further evident that although the preferred embodiment exemplified herein utilized a cast aluminized double-base solid propellant grain having five layers, other solid propellant systems and number of layers may be utilized. For example, systems may be utilized in which fuel binders such as polyurethane, polysulfide or copolymer polybutadiene rubbers or highly plasticized thermoplastics such as polyvinyl chloride, or mono-propellant binders including poly petrin acrylate are used in conjunction with crystalline fuels such as aluminum and/or crystalline oxidants such as ammonium nitrate. The number of layers of propellant to be employed in any given system is dependent on the amount of tolerance permissible in respect to deviation between the pressure peaks of the various layers and the mean value for the entire propellant mass. Additionally, techniques can be employed, due to freedom of access for casting in accordance with this invention, whereby the various layers may be distinct in respect to propellant systems to achieve the best possible combinations of physical and chemical characteristics. However, in all instances the individual concentric layers will have decreased burning rates relative to each other in radial progression. Although silica loaded Buna N rubber is a preferred insulating material, other insulating material such as phenolic-asbestos, phenolic-glass, epoxy-zirconia, and various rubbers may be utilized. In this respect, it will be noted that the thickness of the insulating material conforms to the duration of exposure to the hot gases of combustion internally generated with the thickest portion being innermost and uniformly diminishing to a feather edge at the constant radius surface of the motor chamber. Still further, in addition to the particular resins and adhesives disclosed in conjunction with the preferred embodiment of the invention, other materials suitable for this purpose may be utilized and in lieu of the injection principle disclosed for bonding the abutting inhibited charge surfaces, adhesive may be applied thereto prior to telescopic engagement of the sections.

It will be apparent from the foregoing that the advantages of the invention are multifold. The use of a method of manufacture whereby the various segments of the rocket motor are bonded together late in manufacture yields a useful tool for the variation of rocket size. For certain applications it is possible to make a selection of various propellant charge lengths shortly prior to anticipated use. In these instances the particular overall length desired is achieved by decreasing or increasing the number of segments for a given design. The technique of this invention lends itself readily to the manufacture of large grain configurations. In very large units the logistics involved in the handling of large heavy items is improved by the segmented manufacturing technique of this invention. A further advantage accruing through the multiple segment design is the fact that the interior of the rocket motor is readily accessible to accommodate necessary production devices such as cores in grain manufacturing fixtures. In conventional designs the diameter of the nozzle port has been the controlling factor for the introduction and removal of such equipment from the rocket motor. The propellant chamber design of the present invention with its full opening allows the rocket designer wide latitude in manufacturing the grain, in assemblying inert parts into the chamber, and in optimizing lightweight nozzle attachment devices. Still further, the elimination of the major proportion of thermal insulation in accordance with this invention by utilizing the multiple propellant layer concept yields a significant reduction in inert weight.

What we claim and desire to protect by Letters Patent is:

1. A gas-generating device having in combination:
   (a) a substantially tubular casing having a fore section and an aft section telescoped together,
   (b) means bonding said telescoped sections,
   (c) a composite internal-burning solid propellant charge within the casing,
   (d) said charge comprising generally cylindrical fore and aft abutting charge sections,
   (e) means for bonding said charge sections, each said section of which consists essentially of a plurality of coaxial layers of propellant having decreased burning rates in radial progression, and
   (f) said coaxial layers of said fore charge section having the outermost layer of propellant extending substantially traversely across a forward end of the said fore charge section.

2. A gas-generating device especially adapted as a rocket motor having in combination:
   (a) a substantially tubular casing having a fore section and an aft section telescoped together,
   (b) means bonding said telescoped sections,
   (c) a composite internal-burning solid propellant charge within the casing,
   (d) said charge comprising generally cylindrical fore and aft abutting charge sections,
   (e) means for bonding said charge sections, each said section of which consists essentially of a plurality of coaxial layers of propellant having decreased burning rates in radial progression,
   (f) said coaxial layers of said fore charge section having the outermost layer of propellant extending substantially traversely across a forward end of the said fore charge section, and
   (g) an area of insulating material at each end of the casing of diminishing thickness relative to the duration of exposure to hot gases of combustion internally generated by the device.

3. A gas-generating device especially adapted as a rocket motor having in combination:
   (a) a substantially tubular casing having a fore section and an aft section telescoped together,
   (b) means bonding said telescoped sections,
   (c) a composite internal-burning solid propellant charge within the casing,
   (d) said charge comprising generally cylindrical fore and aft abutting charge sections,
   (e) means for bonding said charge sections, each said section of which consists essentially of a plurality of coaxial layers of propellant having decreased burning rates in radial progression,
   (f) said coaxial layers of said fore charge section having the outermost layer of propellant extending substantially traversely across a forward end of the said fore charge section, and
   (g) an area of insulating material at each end of the casing of diminishing thickness relative to the duration of exposure to hot gases of combustion internally generated by the device, said insulating material being bonded to the casing and to the charge in the areas of common contact.

4. A high mass ratio solid propellant rocket motor having in combination:
   (a) a substantially tubular glass-filament wound and bonded casing having a fore section and an aft section telescoped together,
   (b) means bonding said telescoped sections,
   (c) a composite internal-burning solid propellant charge within the casing,
   (d) means bonding said charge to said casing,
   (e) said charge comprising generally cylindrical fore and aft abutting charge sections,
   (f) means for inhibiting and bonding said charge sections, each said section of which consists essentially of a plurality of coaxial layers of propellant having decreased burning rates in radial progression,
   (g) said coaxial layers of said fore charge section having the outermost layer of propellant extending substantially traversely across a forward end of the said fore charge section, and
   (h) an area of insulating material at each end of the casing of diminishing thickness relative to the duration of exposure to hot gases of combustion internally generated by the motor, said insulating material being bonded to the casing and to the charge in the areas of common contact.

5. A high mass ratio solid propellant rocket motor having in combination:
   (a) a substantially tubular glass-filament wound and bonded casing having a fore section and an aft section telescoped together,
   (b) means bonding said telescoped sections internally and externally about the telescoped portion thereof,
   (c) a composite internal-burning solid propellant charge within the casing,
   (d) means bonding said charge to said casing,
   (e) said charge comprising generally cylindrical fore and aft abutting charge sections,
   (f) means for inhibiting and bonding said charge sections, each said section of which consists essentially of a plurality of coaxial layers of propellant having decreased burning rates in radial progression,
   (g) said coaxial layers of said fore charge section having the outermost layer of propellant extending substantially traversely across a forward end of the said fore charge section, and
   (h) an area of insulating material at each end of the casing of diminishing thickness relative to the duration of exposure to hot gases of combustion internally generated by the motor, said insulating material being bonded to the casing and to the charge in the areas of common contact.

References Cited

UNITED STATES PATENTS

| | | | |
|---|---|---|---|
| 2,923,126 | 2/1960 | Precoul | 60—35.3 |
| 2,987,880 | 6/1961 | Kimmel | 60—35.6 |
| 2,988,877 | 6/1961 | Shope | 102—98XR |
| 3,017,743 | 1/1962 | Adelman | 60—35.6 |
| 3,017,836 | 1/1962 | Guay | 60—35.6 |
| 2,987,882 | 6/1961 | Nocke | 60—35.6 |
| 3,009,385 | 11/1961 | Burnside | 86—1 |
| 3,010,355 | 11/1961 | Cuttforth | 86—1 |
| 3,017,746 | 1/1962 | Kiphart | 60—35.6 |
| 3,064,423 | 11/1962 | Frey | 60—35.6 |
| 3,073,242 | 1/1963 | Hewson | 86—1 |

ROBERT F. STAHL, Primary Examiner

U.S. Cl. X.R.

60—255; 86—1; 102—39, 101